US011912537B2

(12) United States Patent

Munoz Sotoca et al.

(10) Patent No.: US 11,912,537 B2

(45) Date of Patent: Feb. 27, 2024

(54) PROGRESSIVE ELEVATOR SAFETY BRAKE

(71) Applicant: Otis Elevator Company, Farmington, CT (US)

(72) Inventors: Javier Munoz Sotoca, Madrid (ES); Luis Mena, Madrid (ES)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 17/846,815

(22) Filed: Jun. 22, 2022

(65) Prior Publication Data

US 2023/0159302 A1 May 25, 2023

(51) Int. Cl.
*B66B 5/22* (2006.01)

(52) U.S. Cl.
CPC .................................... *B66B 5/22* (2013.01)

(58) Field of Classification Search
CPC ...................................................... B66B 5/22
See application file for complete search history.

(56) References Cited

U.S. PATENT DOCUMENTS 10,214,385 B2 * 2/2019 Eastman .................. B66B 5/22
2011/0259677 A1 * 10/2011 Dudde .................. D07B 5/006
187/411

FOREIGN PATENT DOCUMENTS

DE 102014004356 A1 10/2015
DE 102016200593 A1 * 7/2017 .............. B66B 1/06
EP 3564171 A1 11/2019
EP 3702310 A1 9/2020
WO WO-2013165339 A1 * 11/2013 .............. B66B 5/22
WO WO-2014020743 A1 * 2/2014 .............. B66B 5/22
WO WO-2015144686 A1 * 10/2015 .............. B66B 5/22

OTHER PUBLICATIONS

Machine Translation of DE 10 2016 200 593.*
European Search Report for application EP 21383066.4, dated May 10, 2022, 56 pages.

* cited by examiner

*Primary Examiner* — Diem M Tran

(74) *Attorney, Agent, or Firm* — CANTOR COLBURN LLP

(57) ABSTRACT

An elevator safety brake (300) for use in an elevator system, the safety brake includes a safety block (310) substantially made of a polymeric material or a polymer-based composite material. The safety block (310) comprising: an elongate channel (320) defining a channel axis (325), wherein the elongate channel (320) is for receiving an elevator guide rail (330) of the elevator system when in use; and a cavity (340). The safety brake (300) further comprises a first braking component (250, 350) housed in the cavity (340), wherein the first braking component (250, 350) comprises a body (360) and a first braking surface (370). The safety brake (300) further comprises a second braking component (380) comprising a second braking surface (390). The first braking component (250, 350) is arranged on one side of the elongate channel and the second braking component is arranged on the other side of the elongate channel.

16 Claims, 4 Drawing Sheets

PROGRESSIVE ELEVATOR SAFETY BRAKE

FOREIGN PRIORITY

This application claims priority to European Patent Application No. 21383066.4, filed Nov. 25, 2021, and all the benefits accruing therefrom under 35 U.S.C. § 119, the contents of which in its entirety are herein incorporated by reference.

TECHNICAL FIELD

This disclosure relates to a progressive safety brake for use in an elevator system, an elevator system including a progressive safety brake, and to a method of manufacturing a component of the safety brake.

BACKGROUND

It is known in the art to mount safety brakes onto elevator components moving along guide rails, to bring the elevator component quickly and safely to a stop, especially in an emergency. In many elevator systems the elevator car is hoisted by a tension member with its movement being guided by a pair of guide rails. Typically, a governor is used to monitor the speed of the elevator car. According to standard safety regulations, such elevator systems must include an emergency braking device (known as a safety brake or "safety gear") which is capable of stopping the elevator car from moving downwards, even if the tension member breaks, by gripping a guide rail. Safety brakes may also be installed on the counterweight or other components moving along guide rails.

Conventionally, safety brakes are made from metallic components which can be expensive to manufacture and may require many processing steps. A metal-based safety brake contributes additional weight to the elevator component to which it is mounted. The present disclosure aims to provide an improved safety brake for elevator systems.

SUMMARY

According to a first aspect of the present disclosure, there is provided an elevator safety brake for use in an elevator system, the safety brake comprising: a safety block, wherein the safety block is substantially made of a polymeric material or a polymer-based composite material, the safety block comprising: an elongate channel defining a channel axis, wherein the elongate channel is for receiving an elevator guide rail of the elevator system when in use; and a cavity; wherein the safety brake further comprises: a first braking component housed in the cavity, wherein the first braking component comprises a body and a first braking surface; a second braking component comprising a second braking surface; wherein the first braking component is arranged on one side of the elongate channel and the second braking component is arranged on the other side of the elongate channel; wherein the first braking component is arranged to move in a direction generally parallel to the channel axis between a first position and a second position; and wherein, when the first braking component is in the first position, the first braking surface and the second braking surface defines a first separation distance, and when the first braking component is in the second position, the first braking surface and the second braking surface defines a second separation distance, wherein the second separation distance is smaller than the first separation distance.

According to a second aspect of the present disclosure, there is provided an elevator system comprising: an elevator car; a guide rail; and an elevator safety brake mounted on the elevator car, the safety brake comprising: a safety block, wherein the safety block is substantially made of a polymeric material or a polymer-based composite material, the safety block comprising: an elongate channel defining a channel axis, wherein the elongate channel receives the elevator guide rail of the elevator system; and a cavity; wherein the safety brake further comprises: a first braking component housed in the cavity, wherein the first braking component comprises a body and a first braking surface; a second braking component comprising a second braking surface; wherein the first braking component is arranged on one side of the guide rail received in the elongate channel and the second braking component is arranged on the other side of the guide rail received in the elongate channel; wherein the first braking component is arranged to move in a direction generally parallel to the channel axis between a first position and a second position; and wherein, when the first braking component is in the first position, the first braking surface and the second braking surface define a first separation distance that is greater than a width of the guide rail and when the first braking component is in the second position, the first braking surface and the second braking surface define a second separation distance, wherein the second separation distance is less than the first separation distance; and wherein, when the first braking component is in the second position, the first braking surface engages the elevator guide rail such that a braking force is applied thereto.

It will be appreciated that, when in use, an elevator guide rail is received within the elongate channel, wherein the elongate channel has a width (i.e. a dimension perpendicular to the channel axis from the one side of the channel to the other side of the channel) and a depth (i.e. a dimension perpendicular to the channel axis and perpendicular to the axis defining the width) which allows the guide rail to pass through the elongate channel when the elevator car is in motion without the safety brake engaging the guide rail (and providing a braking force) when the safety brake has not been actuated (i.e. no braking is required by the system and thus the first braking component is in the first position). As such, it will be appreciated that the first separation distance (i.e. the distance between the first braking surface and the second braking surface which is perpendicular to the channel axis and parallel to the width of the elongate channel) is greater than the width (i.e. the dimension parallel to the width of the elongate channel) of the guide rail received in the elongate channel in the elevator system such that when the first braking component is in the first position, the first braking surface and the second braking surface do not engage the guide rail.

When the safety brake is active (i.e. the system actuates emergency braking), the first braking component is moved from the first position to a second position wherein the distance between the first braking surface and the second braking surface is defined by a second separation distance. The second separation distance is smaller than the first braking distance (i.e. the first braking surface and the second braking surface are moved to be closer together). In some examples, the second separation distance is such that, when the first braking component is in the second position, the first braking surface engages the guide rail of the elevator system and a braking force is applied. Thus, it will be appreciated that, when the first braking component moves from the first position to the second position, the first braking component acts to grip the guide rail and stop the elevator car.

It will be understood that the first braking component being arranged to move in a direction generally parallel to the channel axis between the first position and the second position means that the majority of its movement in this direction, but of course for the separation distance to be reduced the first braking component also moves to some degree in the direction perpendicular to the channel axis. This may be achieved, for example, by the first braking component comprising a wedge-shaped body, as is described further below.

The inventors have surprisingly found that the safety block may be substantially made of a polymeric material or a polymer-based composite material whilst maintaining a comparable braking force and braking performance to conventional metallic safety blocks. It may have been expected that a safety block substantially made of a polymeric material or polymer-based composite material would not be able to withstand the stresses and forces necessarily experienced within a safety brake. However, the inventors have surprisingly found this not to be the case and that a polymer-based safety block may advantageously allow a safety brake to be manufactured with an improved weight and with a manufacturing process comprising fewer steps and/or lower associated costs.

In some examples, the safety block is formed as a single unitary piece. For example, the safety block may be moulded as a single unitary piece from the polymeric material or polymer-based material. In some examples, the polymeric material is suitable for use in injection moulding. For example, the polymeric material consists of or comprises a thermoplastic polymer. In some other examples, the polymeric material consists of or comprises a thermosetting polymer.

In some examples, the safety block is substantially made of a polymer-based composite material, e.g. comprising a polymeric (e.g. thermoplastic) matrix with fibre and/or particulate reinforcement dispersed therein. The polymer matrix may comprise a homopolymer, a heteropolymer, a block co-polymer (e.g. di-block polymers, e.g. tri-block polymers), or any suitable and/or desirable blend or mixtures thereof. In some examples the polymer(s) forming the polymer matrix may be natural or synthetic. In some examples, the (e.g. blend of) polymer(s) forming the polymer matrix comprise thermoplastic polymer(s) is suitable for use in an injection moulding process for the manufacture of the safety block.

In some examples, the polymeric material or the polymer-based composite material has a Young's modulus of between 1000 MPa and 10000 MPa, e.g. between 1000 MPa and 5000 MPa, e.g. between 2000 MPa and 4000 MPa, e.g. between 3000 MPa and 3500 MPa. It will be appreciated that Young's modulus is a numerical constant used to describe the elastic properties of a solid material. It is essentially a measure of the material's ability to withstand changes in length by measuring the rate of change of strain as a function of stress. There are a number of standard testing procedures which may be used to determine the Young's modulus of a material including, but not limited to, ASTM C1557, ASTM D5450, ASTM E111, ASTM E2769 and DIN EN ISO 527-2. Preferably, DIN EN ISO 527-2 is used with a parameter of approximately 1 mm/min. It will be appreciated that the skilled person would readily be able to determine the correct testing parameter for different materials and shapes.

In some examples, the polymeric material or the polymer-based composite material has a tensile strength of between 50 MPa and 500 MPa, e.g. between 100 MPa and 300 MPa, e.g. between 110 MPa and 150 MPa, e.g. between 120 MPa and 130 MPa. It will be appreciated that tensile strength (also known as the yield strength) is a numerical constant used to describe the stress a material can withstand without permanent deformation, i.e. the stress at which the material no longer returns to its original dimensions (within ±0.2% in length). It is essentially a measure of the material's ability to withstand deformation. There are a number of standard testing procedures which may be used to determine the tensile strength of a material including, but not limited to, ASTM D638 and DIN EN ISO 527-2. Preferably, DIN EN ISO 527-2 is used with a parameter of between 1 mm/min and 2 mm/min. It will be appreciated that the skilled person would readily be able to determine the correct testing parameter for different materials and shapes.

In some examples, the polymeric material or the polymer-based composite material has a flexural strength of between 50 MPa and 500 MPa, e.g. between 100 MPa and 300 MPa, e.g. between 100 MPa and 200 MPa, e.g. between 120 MPa and 180 MPa, e.g. between 140 MPa and 170 MPa, e.g. between 160 MPa and 170 MPa. It will be appreciated that flexural strength (also known as the modulus of rupture) is a numerical constant used to describe the stress a material can withstand upon bending before yield, i.e. the stress on bending at which the material no longer returns to its original dimensions. It is essentially a measure of the material's ability to withstand bending deformation. There are a number of standard testing procedures which may be used to determine the flexural strength of a material including, but not limited to, ASTM D790 and DIN EN ISO 178. Preferably, DIN EN ISO 178 is used with a parameter of 2 mm/min and a force of 10 N. It will be appreciated that the skilled person would readily be able to determine the correct testing parameter for different materials and shapes.

In some examples the polymeric material or polymer-based composite comprises a polyimide (e.g. aliphatic polyimide, semi-aromatic polyimide and/or aromatic polyimide), a polyamide (e.g. aliphatic polyamide, polyphthalamide and/or polyaramid), a polyacrylamide or a polyketone. In some examples, the polymer or polymer matrix comprises polyetherimide (PEI). In some examples, the polymer or polymer matrix comprises polyether ether ketone (PEEK). In some examples, the polymer or polymer matrix comprises Nylon 6 and/or Nylon 66.

In some examples, the polymer-based composite material comprises a (e.g. thermoplastic) polymer matrix including fibre reinforcement (e.g. glass fibre reinforcement). In some examples, the polymer-based composite comprises between 10 wt. % and 80 wt. % glass fibre, e.g. between 20 wt. % and 60 wt. % glass fibre, e.g. between 30 wt. % and 50 wt. % glass fibre, for example dispersed in a polymer matrix of Nylon 6 and/or Nylon 66.

The inventors have found that, when the safety block is substantially made of a polymer or polymer-based composite material, the cost of manufacturing the safety brake can be reduced (e.g. the manufacturing costs and/or the material costs) and more green manufacturing processes may be used. Furthermore, the use of polymer or polymer-based composite material (i.e. instead of a conventional metal-based materials) can result in an improved (e.g. lower) weight of the safety block and therefore an improved (e.g. reduced) risk of injury. It has also been appreciated by the inventors that a safety block made from a polymer or polymer-based composite material is less corrodible than metal-based components.

In addition to the safety block itself being made of a polymeric material or a polymer-based composite material, in at least some examples the inventors have found that one or more parts of the braking components may also be polymer-based. This can provide an additional weight saving and benefits in terms of ease of manufacture.

In some examples, the body of the first braking component is made of a polymeric material or a polymer-based composite material. For example, the polymeric material or polymer-based composite comprises a polyimide (e.g. aliphatic polyimide, semi-aromatic polyimide and/or aromatic polyimide), a polyamide (e.g. aliphatic polyamide, polyphthalamide and/or polyaramid), a polyacrylamide or a polyketone. In some examples, the polymer matrix comprises polyetherimide (PEI). In some examples, the polymer matrix comprises polyether ether ketone (PEEK). In some examples, the polymer matrix comprises Nylon 6 and/or Nylon 66.

In some examples, the polymer-based composite material comprises a (e.g. thermoplastic) polymer matrix including fibre reinforcement (e.g. glass fibre reinforcement). In some examples, the polymer-based composite comprises between 10 wt. % and 80 wt. % glass fibre, e.g. between 20 wt. % and 60 wt. % glass fibre, e.g. between 30 wt. % and 50 wt. % glass fibre, for example dispersed in a polymer matrix of Nylon 6 and/or Nylon 66.

In some examples, the body of the first braking component is made of the same polymeric material or polymer-based composite material as the safety block. In some examples, the body of the first braking component is made of a different polymeric material or polymer-based composite material as the safety block. In some other examples, the body of the first braking component is made of a metallic material or a metal-based composite material.

The inventors have advantageously found that, when the body of the first braking component is comprised of a polymeric material or a polymer-based composite material, the weight of the first braking component is reduced. As a result, the pull force required to activate the safety brake (i.e. move the first braking component between (e.g. from) the first position and (e.g. to) the second position) is improved (e.g. reduced) with respect to conventional metal-based safety brakes which are heavier.

Furthermore, the polymeric material or polymer-based composite material provides an advantageous spring force effect applied by moving the first braking component from the first position to the second positon. For example, the improved (e.g. reduced) modulus of elasticity of polymeric materials or polymer-based composite materials, compared to metal-based materials, advantageously allows a braking force to be provided by the first braking component acting on the guide rail with less force being generated for the same deformation. Due to the lower modulus of elasticity of the first braking component, i.e. lower stiffness of a polymeric material, the safety brake behaves like a progressive brake instead of an instantaneous one, despite having no springs.

In some examples, the first braking surface is made from a material which is the same as the body of the first braking component. For example, both the body and the first braking surface may be made of a metallic material or a metal-based composite material. In some examples, the first braking surface is made from a different material to the body of the first braking component. For example, in some examples the first braking surface is made of a metallic material or metal-based composite material and the body is made from a polymeric material or a polymer-based composite material. In at least some examples, the first braking surface is made from a metallic or metal-based composite material. For example, the first braking surface may be made of steel. In some examples, the first braking surface is an organic brake pad. An organic brake pad may comprise a resin matrix with at least one of rubber, carbon-based compounds (e.g. graphene), glass, fibreglass dispersed therein. In some examples, the first braking surface is made from a ceramic material and/or ceramic composite material (e.g. a ceramic matrix with (e.g. metal, e.g. copper fibres dispersed therein).

In some examples, the body of the first braking component comprises a surface which forms the first braking surface. In other examples, the first braking surface may be provided by an independent surface component, wherein the surface component may be fixedly attached to the body of the first braking component in any suitable and/or desirable way. For example, the surface component may be adhered to the first braking component using a glue or adhesive layer. Additionally or alternatively, the surface component may be mechanically secured to the body using any suitable and/or desirable securing means, such as clamps, screws or nails. In some examples, the surface component may be formed directly onto the body of the first braking component, e.g. the surface component may be a coating or a layer, e.g. formed by deposition such as chemical vapour deposition or electroplating methods.

In some examples, the surface component comprises at least one protrusion (e.g. on an outer surface of the component which is opposite to (and thus faces away from) the first braking surface, and the body of the first braking component comprises at least one corresponding indentation (e.g. a recess) which is arranged to receive the protrusion(s) of the surface component, wherein the engagement of the protrusion(s) and the indentation(s) acts to secure the surface component to the body of the first braking component.

In some examples, the engagement between the protrusion(s) of the surface component and the indentation(s) of the body may be a press-fit engagement. For example, a press-fit engagement may be formed by applying pressure sufficient to overcome frictional forces (e.g. arising from a difference in the dimensions of the indentation(s) and the protrusion(s)) such that the protrusion(s) of the surface component is forced inside the indentation(s) of the cavity. In some other examples, alternatively or in addition, the engagement between the protrusion(s) and the indentation(s) may comprise a lock-and-key or other corresponding fit. For example, the indentation(s) (e.g. recesses) may correspond closely to the negative shape of the protrusion(s) such that the surface component is secured to the body by a mating interaction between the protrusion(s) of the surface component and the indentation(s) of the body.

In some examples, the first braking component further comprises a second surface on the opposite side of the body to the first braking surface. In some examples, the second surface is not parallel to the first braking surface (e.g. the plane of the second surface intersects the plane of the first braking surface at an angle of about 45° or less, e.g. less than 40°, e.g. less than 30°, e.g. less than 20°, e.g. less than 15°, e.g. less than 10°. In some examples, the first braking component has an approximately right angled trapezoid cross-sectional shape (i.e. the cross-section taken in the plane defined by the channel axis and the axis parallel to the elongate channel width).

In such examples, the right angled trapezoid cross-sectional shape comprises four sides: a first major side and a second major side; and a first minor side and a second minor side. The first major side is smaller (i.e. the length of the side is smaller) than the second major side and the first minor side is smaller (i.e. the length of the side is smaller than) the second minor side. The first major side extends between one end of the first minor side and the (i.e. same end of) second minor side and the second major side extends between the other end of the first minor side and the second minor side, wherein the first major side is generally parallel to the channel axis and substantially perpendicular to the first minor side and the second minor side.

When the first braking component has an approximately right-angled trapezoid cross-sectional shape, a first surface of the first braking component may be defined as the surface formed by the first major side and a depth of the first braking component (i.e. the (length) dimension of the first braking component in the axis parallel to the axis defining the elongate channel depth and perpendicular to the channel axis and the axis defining the elongate channel width). Similarly, the second surface of the first braking component may be defined as the surface formed by the second major side and the depth of the first braking component.

In examples where the first braking component has an approximately right-angled trapezoid cross-sectional shape, the first surface (i.e. defined by the first major side and the depth of the first braking component) comprises the first braking surface. In some examples, the first surface may further comprise a non-braking surface (e.g. a region that does not engage the guide rail when the safety brake is actuated and the first braking component is moved such that the first braking surface engages the guide rail). In some examples, the non-braking surface at least partially surrounds the first braking surface. For example, the non-braking surface may be above and below the first braking surface with the braking surface extending therebetween. The non-braking surface may be formed by the body of the first braking component (e.g. the surface component does not entirely cover the first surface).

In some examples, the first braking surface protrudes (e.g. is not flush with) the non-braking surface. Such an arrangement means that, when the first braking component is moved such that the first braking surface engages the guide rail in use, the non-braking surface does not engage the guide rail.

In some examples, the cavity may have an approximately right angled trapezoid cross-sectional shape (i.e. the cross-section taken in the plane defined by the channel axis and the axis parallel to the elongate channel width).

In such examples, the right angled trapezoid cross-sectional shape of the cavity comprises a first major wall, a first minor wall and a second minor wall. The second major wall extends from between one end of the first minor wall and the (i.e. same end of) second minor wall and the elongate channel extends between the other end of the first minor wall and the second minor wall, wherein the channel axis is substantially perpendicular to the first minor wall and the second minor wall. In some examples, the first major wall is not parallel to channel axis (e.g. the first major wall is angularly offset from the channel axis), e.g. the plane of the first major wall intersects the channel axis at an angle of about 45° or less, e.g. less than 40°, e.g. less than 30°, e.g. less than 20°, e.g. less than 15°, e.g. less than 10°.

In some examples, when the first braking component is in the first position and/or the second position, at least part of the second surface may contact the first major wall of the cavity. In some preferred examples, at least part of the second surface may be in contact with the first major wall of the cavity when the first braking component is moved from the first position to the second position (and from the second position to the third position). It will be appreciated that the part of the second surface that is in contact with the first major wall when the first braking component is in the first position may be a different part to the part of the second surface which is in contact with the first major wall when the first braking component is in the second (or third) position.

When the first major wall is angularly offset from the channel axis, the engagement of the second surface of the first braking component as the first braking component moves in a direction generally parallel to the channel axis results in an accompanying displacement of the first braking component in the direction perpendicular to the channel axis (e.g. the direction parallel to the axis defining the width of the elongate channel). As a result, the separation distance between the first braking surface and the second braking surface in the first position is greater than the separation distance between the first braking surface and the second braking surface in the second position.

In some examples, the cavity has a shape that is substantially the same cross-sectional shape (i.e. in the plane formed by the channel axis and the axis parallel to the elongate channel width) as the first braking component but with different dimensions. For example, the cavity has substantially the same (right-angled trapezoid) cross-sectional shape but is scaled to a larger size with respect to the size of the first braking component.

In such examples, it may be preferred that the angle at which the first major wall intersect the channel axis is (approximately) the same as the angle at which the plane of the second surface of the first braking component intersects the plane of the first surface of the first braking component. In such examples, when the first braking component is in the first position, the second surface of the first braking component engages (e.g. is in contact, e.g. is substantially flush to) the first major wall of the cavity. Furthermore, the second surface may (e.g. continuously) engage the first major wall of the cavity when the first braking component is moved from the first position to the second position (and from the second position to the third position). For example, the second surface of the first braking component is arranged to slide along (in a direction substantially parallel to the channel axis) the first major wall of the cavity by virtue of the second surface and the first major wall having the same angular displacement with respect to the channel axis.

It will be appreciated that, the braking force applied to the guide rail when the safety brake is in use may be tuned by varying the length of the first major wall (i.e. the distance over which the first braking component may travel) and/or increasing or decreasing the angle at which the first major wall intersects the channel axis. For example, increasing the length of the cavity results in a greater potential displacement of the first braking component (i.e. when moving from the first position to the second (or third) position) in the axis parallel to the elongate channel width and thus a greater potential force to be applied to the guide rail. Similarly, a greater angle of intersection (e.g. an increased slope) of the first major wall with the channel axis results in a greater potential displacement of the first braking component (i.e. when moving from the first position to the second (or third) position) in the axis parallel to the elongate channel width per unit of movement in the direction parallel to the channel axis, and thus a greater potential force to be applied to the guide rail when in use.

It will be appreciated that, when the second surface is in contact with the first major wall of the cavity, frictional forces may arise to oppose the movement of the first braking component from between the first position and the second position (and the second position to a third position as described below) and thus an undesirably high pull force may be required to activate the safety brake. In some examples, an improvement (e.g. reduction) in the coefficient of friction between the second surface and the safety block may be desirable to reduce the pull force (e.g. by the actuator) required to activate the safety brake. Thus, in some examples the second surface may comprise a friction-reducing component (e.g. wherein the friction-reducing component reduces the coefficient of friction between the first major wall and the second surface).

It will be appreciated that the coefficient of friction provides a numerical constant that defines the ratio of the frictional force resisting the motion of two surfaces in contact to the normal force pressing the two surfaces together. The skilled person will know how a coefficient of friction may be measured, including a number of standard testing procedures which may be used, for example ASTM D1894-14.

In some examples, the friction-reducing component comprises a layer or a coating comprising a material having a relatively low coefficient of friction (i.e. a coefficient of friction which is lower than the coefficient of friction of the material of the body). For example, the friction-reducing component may comprise a layer or coating of polytetrafluoroethylene (PTFE).

In some examples, the friction-reducing component comprises a plurality of rolling elements, e.g. arranged such that (at least one) axis of rotation (e.g. an axis around which the rolling elements may rotate) of the rolling elements is perpendicular to the channel axis (e.g. and parallel to the axis defining the depth of the elongate channel). In some examples, the rolling elements are roller bearings or ball bearings.

In such examples, it may be appreciated that the rolling elements may exert a pressure on the body of the first braking component, such that the pressure may form indentations or elongate channels on the body of the first braking component. As such, when the friction reducing component comprises rolling elements, it may be desirable for the friction-reducing component to further comprise a metal plate arranged between the body of the first braking component and the rolling elements. In so doing, the pressure generated by the rolling elements engaging the first major wall of the cavity may be dissipated across a greater surface area such that indentations are reduced.

Similarly, the pressure generated by the rolling elements engaging the first major wall of the cavity may also form indentations (e.g. deformation) of the first major wall. As such, it may also be desirable, when the friction-reducing component comprises rolling elements, for the cavity (e.g. the first major wall of the cavity) to comprise a protective lining, e.g. a metallic lining or a plate.

As mentioned above, the first braking component provides an initial braking force against a guide rail (e.g. in the second position) and then the first braking component moves further to bring the second braking component (on the opposite side of the elongate channel) into contact with the guide rail (e.g. in the third position as described below). Ultimately, the safety brake acts to pinch the guide rail between the first and second braking components.

In some examples the second braking component is elongate, e.g. having a length (i.e. parallel to the channel axis) which is (substantially) greater than its width (e.g. defined by the axis parallel to the elongate channel depth). For example, the second braking component extends along at least part of the elongate channel in a direction parallel to the channel axis. In preferred examples, the second braking component extends along substantially the whole length of the elongate channel (i.e. in the direction parallel to the channel axis).

In some examples, the second braking component comprises a metallic material or a metal based composite material. In some examples, the second braking component is (substantially entirely) made of a metallic material or a metal-based composite material.

In some examples, the first braking surface is made of a material that has a higher coefficient of friction (e.g. with the guide rail) than the material of the second braking surface. For example, in one example, the first braking surface is made of steel and the second braking component is made of brass. By selecting the second braking surface to have a lower coefficient of friction (e.g. upon engagement with the guide rail) than the first braking surface, it has been appreciated that the force required to disengage (e.g. deactivate) the safety brake is desirably reduced without significantly affecting the brake force or braking effectiveness of the safety brake when activated.

In some examples, the first braking surface and/or the second braking surface may comprise at least one surface feature(s) which modifies the coefficient of friction between the (first or second) braking surface and the surface of the guide rail. For example, the surface feature(s) may be selected to be one of a protrusion(s), an indentation(s), knurlings or a surface treatment such as a (e.g. chemical) coating or layer. It will be appreciated that by incorporating a surface feature on the (first or second) braking surface, the relative (e.g. ratio of the) coefficients of friction between the first braking surface and the guide rail, and the second braking surface and the guide rail, may be tuned (e.g. increased or decreased) to provide improved braking properties.

In some examples, the first braking component may further move between the second position and a third position, wherein, when the first braking component is in the third position, the first braking surface and the second braking surface define a third separation distance, wherein the third separation distance is smaller than the second separation distance. As such, when the safety brake is active, the first braking component may move from the second position to the third position wherein the second braking surface engages the guide rail and an additional braking force is applied. Thus, it will be appreciated that, when the first braking component moves from the second position to the third position, the first braking component and the second braking component act to clamp the guide rail from opposite sides of the elongate channel and stop the elevator car. In some examples, the third separation distance is the same as, or preferably less than, the width of the guide rail.

In some examples, the safety brake comprises a (e.g. adjustable) stopper. A stopper may be included within the safety brake to set the braking force applied by the first braking component to the guide rail in use. For example, at least part of the stopper may extend into the cavity (e.g. through the substantially cylindrical bore). By varying the extent to which the stopper extends into the cavity (e.g. using stoppers of different lengths or by adjusting the stopper to be at different positions), the length of the cylindrical cavity may be varied (e.g. the length parallel to the elongate channel over which the first braking component may move). As such, the displacement of the first braking component along the direction generally parallel to the channel axis (as described above) may be increased or decreased by decreasing or increasing the extent to which the stopper extends into the cavity respectively. In some examples, when the safety brake is in the third position, the first braking component engages the stopper and the separation distance between the first braking surface and the second braking surface is at a minimum, (e.g. a maximum braking force is applied to the guide rail in use).

The stopper may thus act to further limit the movement of the first braking component. It will be appreciated that, in the absence of a stopper, an excessive braking force may be applied to the guide rail when the first braking surface and the second braking surface are arranged to clamp the guide rail. As such, the stopper prevents dragging of the guide rail and allows the safety brake to be set to apply only the sufficient force required to brake the elevator car.

In some examples, the stopper is made from a polymeric material or a polymer-based composite material (e.g. any of the materials described above in relation to the safety block). In some other examples, the stopper is made from a metallic material or a metallic-based composite material. For example, the stopper is made from steel.

In some examples, the safety block further comprises a substantially cylindrical bore (e.g. comprising an interior surface) which extends through a wall (e.g. the second minor wall) of the safety block into the cavity. The stopper may extend through the substantially cylindrical bore into the cavity.

In some examples, the substantially cylindrical bore comprises an internal thread. A threaded stopper, for example, may be received directly in the cylindrical bore. In some examples, the thread may be unitary with the interior surface of the cylindrical bore, e.g. the interior surface of the substantially cylindrical thread comprises the thread. For example, the thread may be formed from the same material as the wall of the cavity, e.g. the thread may be formed during the manufacture (e.g. moulding) of the safety block or when forming the whole (e.g. by drilling through the cavity wall to form a threaded bore).

In some other examples, the safety brake comprises an internally threaded component received within the substantially cylindrical bore. In some examples, an internally threaded component is arranged within the substantially cylindrical bore to receive the stopper, such that the stopper is adjustable. The internally threaded component may be held within the substantially cylindrical bore by any suitable and/or desirable means. For example, the internally threaded component may be adhered to the interior surface of the cylindrical bore using a glue or adhesive layer. Additionally or alternatively, the internally threaded component may be mechanically secured to the cylindrical bore using any suitable and/or desirable securing means, such as clamps, screws or nails.

In some examples, the (e.g. adjustable) stopper comprises a screw and a nut, wherein the screw comprises a threaded shaft (e.g. which extends into the cavity). In preferred examples, the screw has a complementary thread to the thread of the substantially cylindrical bore (e.g. the internal thread of the interior surface of the substantially cylindrical bore or the internal thread of the threaded component received within the substantially cylindrical bore). In such examples, the extent to which the shaft extends into the cavity may be adjusted by turning the screw in the cylindrical bore. The nut may be used to secure the desired position of the screw.

In some examples, the internally threaded component comprises at least one protrusion and/or indentation (e.g. on a surface of the threaded component which is opposite to (and thus faces away from) a surface which includes the thread), and the interior surface of the substantially cylindrical bore comprises at least one corresponding indentation (e.g. a recess) and/or protrusion which is arranged to receive the protrusion(s) and/or indentation(s) of the threaded component, wherein the engagement of the protrusion(s) and the indentation(s) acts to secure the threaded component within the substantially cylindrical bore.

In some examples, the substantially cylindrical bore is formed during the manufacture of the safety block. For example, the substantially cylindrical bore may be formed during a moulding process used to form the safety block, e.g. the mould used to make the safety block may include a feature which forms the cylindrical bore. This can avoid the safety block being weakened by a machining process that forms the cylindrical bore separately. In those examples including an internally threaded component received within the substantially cylindrical bore, forming the substantially cylindrical bore may include forming (e.g. moulding) the material of the safety block around the threaded component, for example, during the manufacture of the safety block through a moulding process. In such examples, the internally threaded component may be present as an insert mould. Thus, in some examples, the polymeric material or a polymer-based composite material of the safety block is formed around the internally threaded component.

In some examples, the threaded component may be made of a polymeric or polymer-based composite material. For example, the threaded component may be made from any of the material(s) which may be used for walls of the cavity, e.g. the safety block (as described above). In some examples, the threaded component may be made from the same material as the safety block. In some other examples, the threaded component may be made from a metallic material or metal-based composite material. In such examples, the (e.g. adjustable) stopper may also be made from a metallic material or metal-based composite material (e.g. a screw and nut as described above). In some examples, the stopper is an adjustable stopper received within the threaded component such that the position of the stopper may be adjusted by rotating the stopper to move along the thread of the threaded component (e.g. such that it extends into the cavity to a greater or lesser extent). Such an adjustment may be made to the stopper while the safety brake is in use, e.g. to achieve a desired deceleration profile.

In some examples, the safety block comprises a connection point for a linkage. In some examples, the body of the first braking component comprises the connection point for the linkage. For example, the body of the first braking component may comprise a (e.g. threaded) bore arranged to receive and secure a connecting component of the linkage. In some examples the connecting component may be a pin or a threaded screw which is attached to the linkage. In some examples, the connecting component (e.g. pin or threaded screw) is part of the linkage component (i.e. the connecting component (e.g. pin or threaded screw) extends from (i.e. is continuous with) the linkage component). In these and other examples, the linkage component may extend out of the plane of the safety brake. In some examples, the linkage component comprises a (threaded) bore such that the connecting component (e.g. pin or threaded screw) extends through the (threaded) bore of the linkage component into the (threaded) bore of the first braking component. In these and other examples, the linkage component may extend in the same plane as the safety brake.

In some examples, the (threaded) bore extends through a surface of the body which does not include the first or second surface, e.g. the (threaded) bore extends in a direction parallel to the plane of the first and/or second surface, e.g. the (threaded) bore extends in a direction perpendicular to the channel axis and, thus, perpendicular to the movement of the first braking component.

In some examples, the safety block further comprises a linkage arranged to connect the first braking component to a brake actuator (e.g. the elevator system governor) when in use. For example, when the safety brake is activated, the linkage acts to move (e.g. provide a pull force that moves) the first braking component from the first position to the second position. In some examples, the linkage may additionally act to move (e.g. provide a pull force that moves) the first braking component from the second position to the third position (e.g. until the first braking component engages the stopper). In other examples, the linkage may only provide sufficient force to move the first braking component from the first position to the second position. The continued movement of an elevator car after the first braking component is moved to the second position (e.g. and the first braking surface engages the guide rail) may then act to move the first braking component from the second position to the third position (e.g. progressively decreasing the separation between the first braking surface and the second braking surface and thus increasing the braking force applied to the guide rail when in use).

In some examples, the linkage is made of a polymeric material or a polymer-based composite material (e.g. any of the materials described above in relation to the safety block). In some other examples, the linkage is made from a metallic material or a metallic-based composite material, such as steel.

Although the above only describes the activation of the first braking component, and thus the movement of the first braking component from the first position to the second position (and from the second position to the third position), it will be appreciated that after the elevator car has been stopped, it may be desired to deactivate the safety brake and allow the elevator car to move freely along the guide rail once more. In such a circumstance, it will be appreciated that the reverse of the above may occur.

For example, movement of the elevator car may act to move the safety block with respect to the first braking component such that the first braking component is moved from the third position to the second position, and then, when the second braking position is reached, gravity acts to move the first braking component from the second position to the first position.

A third aspect of the present disclosure provides a method of manufacturing a safety block, the method comprising: preparing a polymeric material or a polymer-based composite material for moulding; and introducing the polymeric material or the polymer-based material into a mould; wherein the mould is arranged to produce a safety block comprising: an elongate channel defining a channel axis, wherein the elongate channel is for receiving an elevator guide rail of the elevator system when in use; and a cavity for housing a first braking component; wherein the cavity is suitable for the first braking component to have a first position and a second position, and for the first braking component to move therebetween in a direction generally parallel to the channel axis; and removing the safety block from the mould.

It will be appreciated that, in some examples, the method of the third aspect may be used to manufacture the safety block according to any or all of the examples described above for the first or second aspects.

Examples according to this third aspect of the disclosure may use any suitable method of introducing the polymeric material or a polymer-based composite material into a mould. For example, the safety block may be formed by a moulding method including but not limited to compression moulding, blow moulding, injection moulding or rotational moulding.

In some examples, the step of preparing the polymeric material or a polymer-based composite material comprises heating the material to a temperature above the material's glass transition temperature and/or melting temperature (depending on the technique and material used) such that the material is in a suitable (e.g. liquid, e.g. viscous) state to be introduced into the mould. It will be appreciated that, when the material is a polymeric material, the glass transition temperature is the temperature at which the polymeric material becomes viscous (e.g. transitions from a solid, relatively brittle and/or glassy state to a viscous or rubbery state) and may be introduced into the mould (e.g. via injection moulding).

Similarly, in examples wherein the material is a polymer-based composite material comprising (e.g. glass, e.g. carbon) fibres, the temperature to which the material is heated is to a temperature above the glass transition temperature (and/or melting temperature) of the polymer-based matrix material (e.g. the polymer into which the (e.g. glass, e.g. carbon) fibres are dispersed) but below the melting temperature of the (e.g. glass, e.g. carbon) fibres dispersed therein such that the glass fibres remain in (e.g. solid) fibre form before, during and after the moulding steps. Thus, the glass transition temperature of the polymer-based composite material is the temperature at which the polymer matrix becomes viscous (e.g. transitions from a solid, relatively brittle and/or glassy state to a viscous or rubbery state) such that the polymer matrix with the (e.g. glass, e.g. carbon) fibres dispersed therein may be introduced into the mould, e.g. via injection moulding.

In some examples, the preparing step comprises heating the polymeric material or polymer-based composite material to a temperature above 120° C., e.g. above 150° C., e.g. above 180° C., e.g. above 200° C., e.g. between 200° C. and 300° C., e.g. between 200° C. and 250° C.

In some examples, the mould may comprise an element to form the substantially cylindrical bore comprising a thread. In other examples, the safety block may be formed without the substantially cylindrical bore and the method further comprises forming the substantially cylindrical bore, e.g. by tapping a bore through a wall of the (e.g. pre-moulded, e.g. pre-formed) cavity.

In some examples, the method may further comprise inserting an internally threaded component into the mould before introducing the polymeric material or the polymer-based material into the mould such that a substantially cylindrical bore is formed around the internally threaded component when the polymeric material or the polymer-based material is introduced. In such examples, the polymeric material or polymer-based composite material may be introduced such that it forms the safety block integrally around the threaded component (e.g. the threaded component is overmoulded with the material of the safety block, e.g. an insert moulding technique).

In some examples, a threaded component may be introduced to the substantially cylindrical bore when the material of the safety block is at any elevated temperature (e.g. above the material's glass transition temperature), e.g. above 45° C., e.g. above 50° C., e.g. above 70° C., e.g. above 100° C., e.g. above 200° C. with subsequent cooling of the cylindrical sleeve to ambient temperature causing contraction of the polymeric material or polymer-based composite material and creating an engagement between the threaded component and the interior surface of the substantially cylindrical bore. Thus the substantially cylindrical bore may contract around the threaded component to create the engagement therebetween.

However, in some other examples the safety block is allowed to completely cool (e.g. to room temperature, e.g. to a temperature below 30° C.) following removal from the mould. In some examples, the method further comprises cooling the safety block, e.g. to a temperature below the material's glass transition temperature, e.g. below 30° C., before the threaded component is inserted into the substantially cylindrical bore. The threaded component may be inserted when the safety block is cool, e.g. a temperature below 30° C. Alternatively, the method may comprise re-heating the safety block to an elevated temperature in a later manufacturing stage. In such examples of the third aspect, the method further comprises a secondary heating step (e.g. re-heating) wherein the safety block (or at least the substantially cylindrical bore) (e.g. after it has been allowed to cool following injection moulding) is heated to an elevated temperature, e.g. a temperature above 30° C., e.g. a temperature above 50° C., e.g. a temperature above 100° C. The elevated temperature at which the threaded component is inserted into the cylindrical cavity can be any temperature that enables subsequent cooling (e.g. contraction) to create an engagement with the bearing.

In some examples, the material is substantially a polymeric material suitable for use in injection moulding, e.g. a thermoplastic polymer. In some examples, the material is a polymer-based composite material, for example a polymeric (e.g. thermoplastic) matrix with fibre reinforcement dispersed therein. The polymer matrix may comprise a homopolymer, a heteropolymer, a block co-polymer (e.g. di-block polymers, e.g., tri-block polymers), or any suitable and/or desirable blend or mixtures thereof. In some examples the polymers forming the polymer matrix may be natural or synthetic. Preferably the (e.g. blend of) polymer(s) forming the polymer matrix comprise thermoplastic polymer(s) suitable for use in an injection moulding process for the manufacture of the cylindrical sleeve.

In some examples, the safety block is substantially made of a polymer-based composite material, e.g. comprising a polymeric (e.g. thermoplastic) matrix with fibre and/or particulate reinforcement dispersed therein. The polymer matrix may comprise a homopolymer, a heteropolymer, a block co-polymer (e.g. di-block polymers, e.g. tri-block polymers), or any suitable and/or desirable blend or mixtures thereof. In some examples the polymer(s) forming the polymer matrix may be natural or synthetic. In some examples, the (e.g. blend of) polymer(s) forming the polymer matrix comprise thermoplastic polymer(s) is suitable for use in an injection moulding process for the manufacture of the safety block.

In some examples, the polymeric material or the polymer-based composite material has a Young's modulus of between 1000 MPa and 10000 MPa, e.g. between 1000 MPa and 5000 MPa, e.g. between 2000 MPa and 4000 MPa, e.g. between 3000 MPa and 3500 MPa. It will be appreciated that Young's modulus is a numerical constant used to describe the elastic properties of a solid material. It is essentially a measure of the materials ability to withstand changes in length by measuring the rate of change of strain as a function of stress. There are a number of standard testing procedures which may be used to determine the Young's modulus of a material including, but not limited to, ASTM C1557, ASTM D5450, ASTM E111, ASTM E2769 and DIN EN ISO 527-2. Preferably, DIN EN ISO 527-2 is used with a parameter of approximately 1 mm/min. It will be appreciated that the skilled person would readily be able to determine the correct testing parameter for different materials and shapes.

In some examples, the polymeric material or the polymer-based composite material has a tensile strength of between 50 MPa and 500 MPa, e.g. between 100 MPa and 300 MPa, e.g. between 110 MPa and 150 MPa, e.g. between 120 MPa and 130 MPa. It will be appreciated that tensile strength modulus (also known as the yield strength) is a numerical constant used to describe the stress a material can withstand without permanent deformation, i.e. the stress at which the material no longer returns to its original dimensions (within ±0.2% in length). It is essentially a measure of the material's ability to withstand deformation. There are a number of standard testing procedures which may be used to determine the tensile strength of a material including, but not limited to, ASTM D638 and DIN EN ISO 527-2. Preferably, DIN EN ISO 527-2 is used with a parameter of between 1 mm/min and 2 mm/min. It will be appreciated that the skilled person would readily be able to determine the correct testing parameter for different materials and shapes.

In some examples, the polymeric material or the polymer-based composite material has a flexural strength of between 50 MPa and 500 MPa, e.g. between 100 MPa and 300 MPa, e.g. between 100 MPa and 200 MPa, e.g. between 120 MPa and 180 MPa, e.g. between 140 MPa and 170 MPa, e.g. between 160 MPa and 170 MPa. It will be appreciated that flexural strength (also known as the modulus of rupture) is a numerical constant used to describe the stress a material can withstand upon bending before yield, i.e. the stress on bending at which the material no longer returns to its original dimensions. It is essentially a measure of the material's ability to withstand bending deformation. There are a number of standard testing procedures which may be used to determine the flexural strength of a material including but not limited to ASTM D790 and DIN EN ISO 178. Preferably, DIN EN ISO 178 is used with a parameter of 2 mm/min and a force of 10 N. It will be appreciated that the skilled person would readily be able to determine the correct testing parameter for different materials and shapes.

In some examples the polymeric material or polymer-based composite comprises a polyimide (e.g. aliphatic polyimide, semi-aromatic polyimide and/or aromatic polyimide), a polyamide (e.g. aliphatic polyamide, polyphthalamide and/or polyaramid), a polyacrylamide or a polyketone. In some examples, the polymer matrix comprises polyetherimide (PEI). In some examples, the polymer matrix comprises polyether ether ketone (PEEK). In some examples, the polymer matrix comprises Nylon 6 and/or Nylon 66.

In some examples, the polymer-based composite material comprises a (e.g. thermoplastic) polymer matrix including fibre reinforcement (e.g. glass fibre reinforcement). In some examples, the polymer-based composite comprises between 10 wt. % and 80 wt. % glass fibre, e.g. between 20 wt. % and 60 wt. % glass fibre, e.g. between 30 wt. % and 50 wt. % glass fibre, for example dispersed in a polymer matrix of Nylon 6 and/or Nylon 66.

Within the meaning of the present disclosure, the glass transition temperature (Tg) of a material is intended to define the temperature at which a polymeric material (or polymer-based composite material) transitions from a hard or brittle state to a soft or rubber state. Similarly, the melting temperature of a material is intended to define the temperature at which a material transitions from a "solid" to a liquid state. It will be appreciated that the melting temperature for a polymeric material will be at a temperature above the glass transition temperature and thus the "solid" state of the polymer before melting may be soft or deformable. The glass transition temperature and melting temperature are well known in the art and may be measured via a number of industry standard techniques as described below:

Differential Scanning calorimetry (DSC) compares the amount of heat supplied to a test sample to the amount of heat supplied to a reference sample to determine the temperature at which the test sample transitions to different states (e.g. glass transition, e.g. melt transition).

Thermal Mechanical Analysis (TMA) is used to measure the coefficient of thermal expansion of a test sample when heated. As polymers tend to expand when heated the expansion curve may be used to calculate the coefficient of thermal expansion. For example, if a polymer passes through Tg the expansion curve changes significantly and Tg may be calculated.

Dynamic Mechanical Analysis (DMA) measures the response of a test sample to an oscillatory stress (or strain) and determines how that response varies with temperature, frequency or both. Tg by DMA may be reported by a. the onset of the storage modulus curve, b. the peak of the loss modulus curve and/or c. the peak of the tan delta curve.

DETAILED DESCRIPTION

Figure 1:
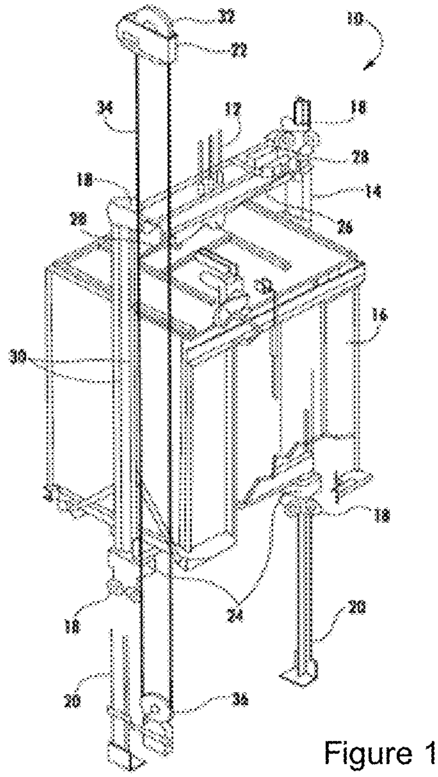
FIG. 1 shows an elevator system.

FIG. 1 shows an elevator system, 10. The elevator system 10 includes cables or belts 12, a car frame 14, an elevator car 16, roller guides 18, guide rails 20, a governor 22, and a pair of safety brakes 24 mounted on the elevator car 16. The governor 22 is mechanically coupled to actuate the safety brakes 24 by linkages 26, levers 28, and lift rods 30. The governor 22 includes a governor sheave 32, rope loop 34, and a tensioning sheave 36. The cables 12 are connected to the car frame 14 and a counterweight (not shown) inside a hoistway. The elevator car 16, which is attached to the car frame 14, moves up and down the hoistway by a force transmitted through the cables or belts 12 to the car frame 14 by an elevator drive (not shown) commonly located in a machine room at the top of the hoistway. The roller guides 18 are attached to the car frame 14 to guide the elevator car 16 up and down the hoistway along the guide rails 20. The governor sheave 32 is mounted at an upper end of the hoistway. The rope loop 34 is wrapped partially around the governor sheave 32 and partially around the tensioning sheave 36 (located in this example at a bottom end of the hoistway). The rope loop 34 is also connected to the elevator car 16 at the lever 28, ensuring that the angular velocity of the governor sheave 32 is directly related to the speed of the elevator car 16.

In the elevator system 10 shown in FIG. 1, the governor 22, a machine brake (not shown) located in the machine room, and the safety brakes 24 act to stop the elevator car 16 if it exceeds a set speed as it travels inside the hoistway. If the elevator car 16 reaches an over-speed condition, the governor 22 is triggered initially to engage a switch, which in turn cuts power to the elevator drive and drops the machine brake to arrest movement of the drive sheave (not shown) and thereby arrest movement of elevator car 16. If, however, the elevator car 16 continues to experience an overspeed condition, the governor 22 may then act to trigger the safety brakes 24 to arrest movement of the elevator car 16 (i.e. an emergency stop). In addition to engaging a switch to drop the machine brake, the governor 22 also releases a clutching device that grips the governor rope 34. The governor rope 34 is connected to the safety brakes 24 through mechanical linkages 26, levers 28, and lift rods 30. As the elevator car 16 continues its descent, the governor rope 34, which is now prevented from moving by the actuated governor 22, pulls on the operating levers 28. The operating levers 28 actuate the safety brakes 24 by moving the linkages 26 connected to the lift rods 30, and the lift rods 30 cause the safety brakes 24 to engage the guide rails 20 to bring the elevator car 16 to a stop.

Whilst mechanical speed governor systems are still in use in many elevator systems, others are now implementing electronically actuated systems to trigger the emergency safety brakes 24. And while the elevator system 10 has been illustrated with cables or belts 12 to move the elevator car 16, the safety brakes 24 will work with ropeless elevator systems as well, for example hydraulic drive, linear motor drive, pinched wheel propulsion, any other ropeless design.

Figure 2:
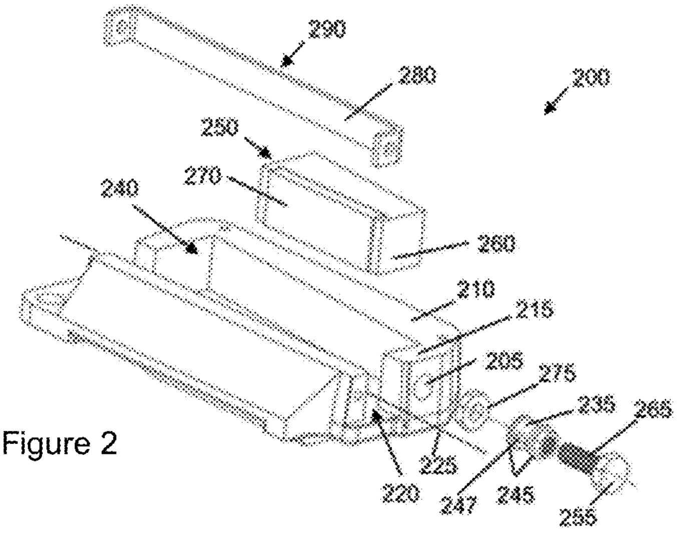
FIG. 2 shows an exploded view of a safety brake according to an example of the present disclosure.

FIG. 2 shows an exploded view of a safety brake 200 according to an example of the present disclosure. The safety brake 200 comprises a safety block 210, wherein the safety block 210 is substantially made of a polymeric material or a polymer-based composite material. The safety block 200 comprises an elongate channel 220 defining a channel axis 225, wherein the elongate channel 220 is for receiving an elevator guide rail (not shown) of the elevator system when in use.

The safety block 210 comprises a cavity 240 and the cavity 240 houses the first braking component 250 of the safety brake 200. The first braking component 250 includes a body 260 and a first braking surface 270. The safety brake 210 also includes a second braking component 280 which includes a second braking surface 290. The first braking component 250 is arranged on one side of the elongate channel 220 and the second braking component 280 is arranged on the other side of the elongate channel 220.

The safety block 210 includes a substantially cylindrical bore 205 which extends through a wall 205 of the safety block 210 into the cavity 240. An internally threaded component 235 is received within the substantially cylindrical bore 205 to provide a thread within the substantially cylindrical bore 205. The threaded component 235 is held within the substantially cylindrical bore 205 by engagement between protrusions 245 (and at least one indentation 247) on the outer surface of the threaded component 235, and the corresponding indentations (and a corresponding protrusion, e.g. keying feature), which are not shown, on the interior surface of the substantially cylindrical bore 205. The protrusions 245 prevent the threaded component 235 from pulling out axially, while the indentation 247 avoids rotation.

Received within the internally threaded component 235 is a stopper 255, in the form of a screw in this example. The threaded component 235 has a complementary thread to the thread on the shaft 265 of the screw 255. The screw 255 may therefore be turned within the threaded component 235 such that the extent to which the shaft 265 extends into the cavity 240 may be adjusted. The screw 255 therefore acts as an adjustable stopper to engage with the first braking component 250 when the safety brake 200 is actuated and the first braking component 250 is in a position to supply the maximum potential force to the guide rail. The nut 245 may then secure the screw 255 in the desired position.

Figure 3:
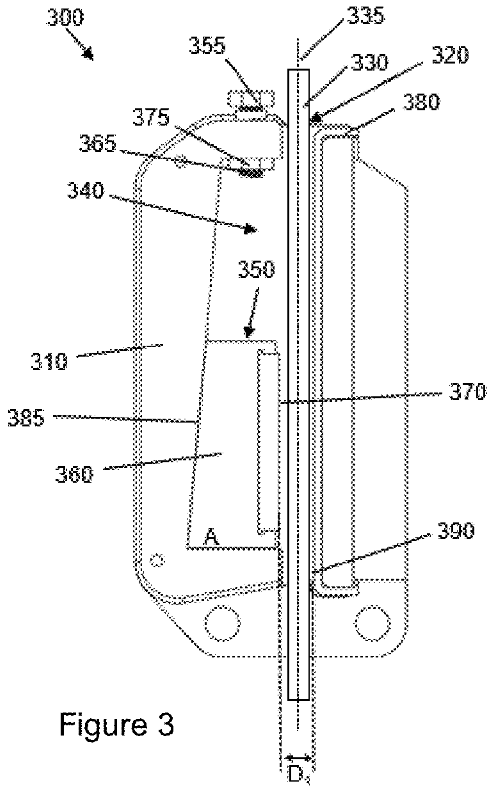
FIG. 3 shows a safety brake according to an example of the present disclosure with the first braking component in the first position.
Figure 4:
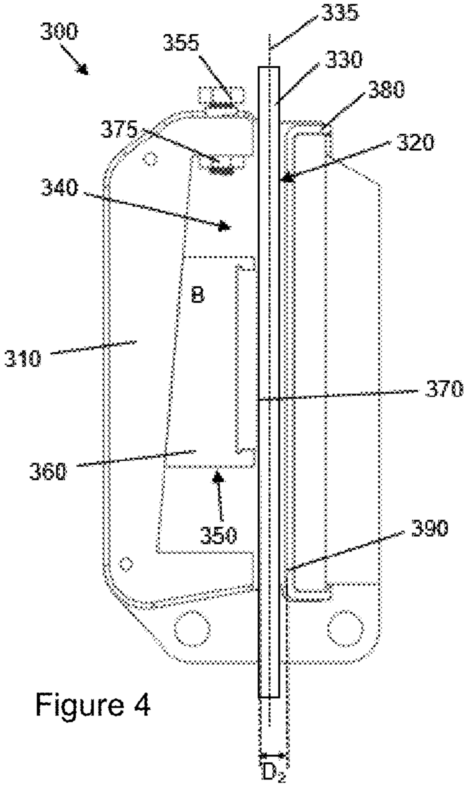
FIG. 4 shows a safety brake according to an example of the present disclosure with the first braking component in the second position.
Figure 5:
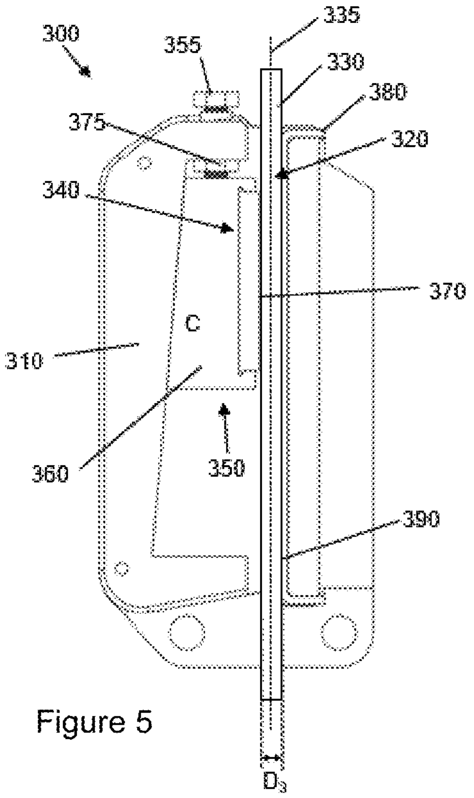
FIG. 5 shows a safety brake according to an example of the present disclosure with the first braking component in the third position.

FIGS. 3, 4 and 5 show an assembled safety brake 300 in three different positions A, B, C associated with different stages of the working of the safety brake 300. The safety brake 300 has most of its feature in common with FIG. 2, such that the description above applies equally to the safety brake 300 seen in FIGS. 3-5.

In FIG. 3, the first braking component 350 is in the first position A where the first braking component 350 is arranged such that the first braking surface 370 does not engage the guide rail 330 (received within the channel) or the screw shaft 365 of the stopper screw 355. When the first braking component 350 is in the first position A, the first braking surface 370 and the second braking surface 390 of the second braking component 380 defines a first separation distance $D_1$ which is perpendicular to the channel axis 335 and thus parallel to the axis defining the width of the elongate channel.

When the first braking component 350 is in the first position A, a second surface 385 of the first braking component 350 engages a wall of the safety block 310 which forms the cavity.

In FIG. 4, the first braking component 350 has moved in a direction generally parallel to the channel axis from the first position A to the first position B, actually in a direction parallel to the angled second surface 385. In the second position B the first braking component 350 is arranged such that the first braking surface 370 engages the guide rail 330 (received within the channel) but the first braking component 350 does not engage the screw shaft 365 of the stopper screw 355. As such a braking force is applied to the guide rail 330 to brake the elevator car via the frictional engagement between the first braking surface 370 and the guide rail 330.

When the first braking component 350 is in the second position B, the first braking surface 370 and the second braking surface 390 of the second braking component 380 defines a second separation distance $D_2$ which is perpendicular to the channel axis 335 and thus parallel to the axis defining the width of the elongate channel.

When the first braking component 350 is in the second position B, the second surface 385 of the first braking component 350 still engages the wall of the safety block 310 which forms the cavity, i.e. when moving from the first position A to the second position B the second surface 385 slides along the wall of the cavity.

In FIG. 5, the first braking component 350 has moved in a direction generally parallel to the channel axis from the second position B to the third position C. In the third position C, the first braking component 350 is arranged such that both the first braking surface 370 and the second braking surface 390 engage the guide rail 330 (received within the channel) and the first braking component 350 engages the screw shaft 365 of the stopper screw 355. As such a maximum braking force for the safety brake 300 is applied to the guide rail 330 to brake the elevator car via the frictional engagement between the first braking surface 370 and the guide rail 330 and the second braking surface 390 and the guide rail 330.

When the first braking component 350 is in the third position C, the first braking surface 370 and the second braking surface 390 of the second braking component 380 defines a third separation distance $D_3$ which is perpendicular to the channel axis 335 and thus parallel to the axis defining the width of the elongate channel. The third separation distance $D_3$ is smaller than the second separation distance $D_2$ and less than the width of the guide rail 330.

When the first braking component 350 is in the third position C, the second surface 385 of the first braking component 350 maintains engagement with the wall of the safety block 310 which forms the cavity, i.e. when moving from the second position B to the third position C the second surface 385 slides along the wall of the cavity.

After braking has been effected, it will be appreciated that the elevator safety brake 300 may be disengaged. As such, disengagement of the safety brake 300 may be represented as the opposite of the process of actuation shown in FIGS. 3-5.

For example, after the safety brake 300 has been disengaged (e.g. released) the first braking component 350 will move from the third position C (FIG. 5) to the second position B (FIG. 2). This movement will primarily result from the movement of the elevator car (i.e. moving the safety block 310) relative to the first braking component 350 such that the separation distance D between the first braking surface 370 and the second braking surface 390 is increased.

Eventually, the first braking component 350 will reach the second position B, which effectively defines the point of first engagement between the elevator guide rail 330 and the first braking surface 370 (e.g. the first position at which a braking force is applied). Thus further movement of the elevator car (after deactivation of the safety brake) will result in the first braking surface 370 being disengaged from the guide rail 330 and gravity acting to move the first braking component 350 back to the first position A.

Figure 6:
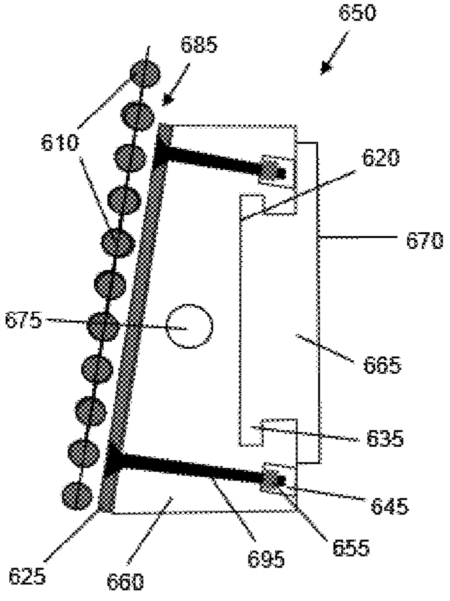
FIG. 6 shows a first safety component according to an example of the present disclosure.

FIG. 6 shows a first braking component 650 according to an example of the present disclosure. The first braking component 650 comprises a body 660 and a surface component, wherein in the example shown, the surface component is in the form of an insert 665. The insert 665 forms the first braking surface 670 of the first braking component 650. The insert component 665 includes a protrusion 635 on the surface of the insert 665 which is opposite to the first braking surface 670. The body 660 of the first braking component 650 comprises at least one corresponding indentation 620 which is arranged to receive the protrusion 635 of the insert component 665, wherein the engagement of the protrusion 635 and the indentation 620 acts to secure the insert component 665 to the body 660 of the first braking component 650.

The first braking component 650 has a second surface 685 on the opposite side of the body 660 to the first braking surface 670. The second surface 685 includes a friction reducing component which includes a row of roller bearings 610 trapped by a metal plate 625. The metal plate 625 is affixed to the body 660 of the first braking component 650 by a screw 695 which extends through the metal plate 625 and the body 660 of the first braking component 650 and is secured by a nut 655 which is received within a recess 645 in the body 660 (so that the screw and nut do not extend beyond the plane formed by the first braking surface 670).

The first braking component 650 incudes a bore 675 which is arranged to provide a connection point to connect the first braking component 650 to a linkage (not shown). The bore 675 may be threaded (i.e. a female thread) such that it is arranged to receive a threaded screw comprising a complementary (i.e. male) thread, wherein the screw is also attached to (e.g. in connection with) the linkage. Alternatively the bore 675 may receive a pin to connection with the linkage.

Figure 7:
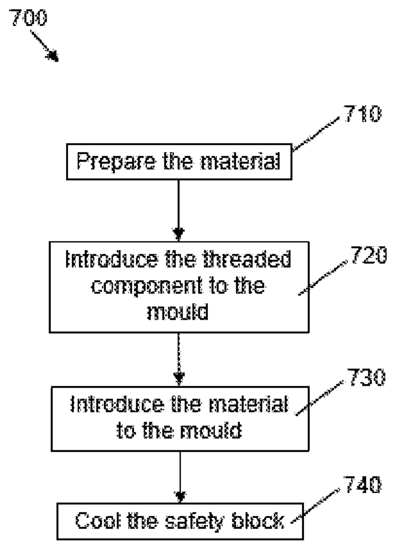
FIG. 7 shows a flow chart of the method according to an example of the present disclosure.

FIG. 7 shows an exemplary method 700 of manufacturing a safety block which will be discussed with reference to FIGS. 2-5. The material used to make the safety block is substantially a polymeric material, or polymer-based composite material.

The method 700 first requires the material to be prepared at step 710 for moulding. The preparing step 710 for a polymeric material or polymer-based composite material includes heating the material to a temperature above at least one of the glass transition temperature or the melting point of the polymer. For a polymer-based composite material, the preparing step 710 optionally includes adding a fibre reinforcement in advance of the moulding step 730.

Whilst the material is being prepared at step 710 for moulding, the threaded component 235 may be introduced to the mould in step 720. For example, the threaded component 235 may be placed in a position such that the substantially cylindrical bore 205 will be formed around the threaded component when the polymeric material or polymer-based composite material is introduced into the mould (i.e. the threaded component is over moulded).

Once heated to an appropriate temperature, the material is introduced (e.g. injected, e.g. poured) at step 730 into the mould (arranged to produce the safety block 210 described herein). For a polymer-based composite material, the moulding step 730 optionally includes adding a fibre reinforcement. Once the material has been injected within the mould, the material is allowed to cool to a temperature below the materials glass transition temperature in step 740 before removing at least part of the mould. By allowing the material to partially cool, it is ensured that the material substantially retains the shape of the mould cavity to provide the desired shape of the safety block.

What is claimed is:

1. An elevator safety brake (200, 300) for use in an elevator system (10), the safety brake (200, 300) comprising:

a safety block (210, 310), wherein the safety block (210, 310) is substantially made of a polymeric material or a polymer-based composite material, the safety block (210, 310) comprising:

an elongate channel (220, 320) defining a channel axis (325), wherein the elongate channel (220, 320) is for receiving an elevator guide rail (330) of the elevator system (10) when in use; and a cavity (240, 340);

wherein the safety brake (200, 300) further comprises:

a first braking component (250, 350) housed in the cavity (240, 340), wherein the first braking component (250, 350) comprises a body (260, 360) and a first braking surface (270, 370);

a second braking component (280, 380) comprising a second braking surface (290, 390);

wherein the first braking component (250, 350) is arranged on one side of the elongate channel (220, 320) and the second braking component (280, 380) is arranged on the other side of the elongate channel (220, 320);

wherein the first braking component (250, 350) is arranged to move in a direction generally parallel to the channel axis between a first position (A) and a second position (B); and wherein, when the first braking component (250, 350) is in the first position (A), the first braking surface (270, 370) and the second braking surface (290, 390) define a first separation distance ($D_1$), and when the first braking component (250, 350) is in the second position (B), the first braking surface (270, 370) and the second braking surface (290, 390) define a second separation distance ($D_2$), wherein the second separation distance ($D_2$) is smaller than the first separation distance ($D_1$).

2. The safety brake (200, 300) as claimed in claim 1, wherein the safety block (210, 310) is formed as a single unitary piece.

3. The safety brake (200, 300) as claimed in claim 1, wherein the polymeric material or polymer-based composite comprises a polyimide, a polyamide, a polyacrylamide, a polyketone, or a polyether ether ketone (PEEK).

4. The safety brake (200, 300) as claimed in claim 3, wherein the polymeric material or polymer-based composite comprises polyetherimide.

5. The safety brake (200, 300) as claimed in claim 1, wherein the body of the first braking component (250, 350) is made of polymeric material or polymer-based composite material, the body having an angled surface corresponding to an angled surface of the safety block.

6. The safety brake (200, 300) as claimed in claim 5, wherein the first braking surface (270, 370) is made from a metallic or metal-based composite material.

7. The safety brake (200, 300) as claimed in claim 1, wherein the first braking component (250, 350) further comprises a second surface (385) on the opposite side of the body to the first braking surface (270, 370), wherein the second surface (385) comprises a friction-reducing component.

8. The safety brake (200, 300) as claimed in claim 7, wherein the friction-reducing component comprises a plurality of rolling elements (610).

9. The safety brake (200, 300) as claimed in claim 1, wherein the first braking surface (270, 370) is made of a material that has a higher coefficient of friction than the material of the second braking surface (290, 390).

10. The safety brake (200, 300) as claimed in claim 1, wherein the safety block (210, 310) includes a stopper (255, 355), and wherein the first braking component (250, 350) may further move between the second position (B) and a third position (C);

wherein, when the first braking component (250, 350) is in the third position (C), the first braking surface (270, 370) and the second braking surface (290, 390) define a third separation distance ($D_3$), wherein the third separation distance ($D_3$) is smaller than the second separation distance ($D_2$); and when the first braking component (250, 350) is in the third position (C) the first braking component (250, 350) engages the stopper (255, 355) such that the separation distance ($D_3$) is at a minimum.

11. The safety brake (200, 300) as claimed in claim 10, wherein the safety block (210, 310) further comprises a substantially cylindrical bore (205) which extends through a wall of the safety block (210, 310) into the cavity (240, 340) and an internally threaded component (235) arranged within the substantially cylindrical bore (240, 340) to receive the stopper (255, 355) such that the stopper (255, 355) is adjustable.

12. The safety brake (200, 300) as claimed in claim 11, wherein the polymeric material or a polymer-based composite material of the safety block is formed around the internally threaded component (235).

13. The safety brake (200, 300) as claimed in claim 1, wherein the second braking component (280, 380) is at a fixed position relative to the safety block (210, 310).

14. An elevator system (10) comprising:

an elevator car (16);

a guide rail (20, 330);

an elevator safety brake (200, 300) mounted on the elevator car (16), the safety brake (200, 300) comprising:

a safety block (210, 310), wherein the safety block (210, 310) is substantially made of a polymeric material or a polymer-based composite material, the safety block (210, 310) comprising:

an elongate channel (220) defining a channel axis (225, 325), wherein the elongate channel (220) receives the elevator guide rail (20, 330) of the elevator system (10); and a cavity (240, 340);

wherein the safety brake (200, 300) further comprises:

a first braking component (250, 350) housed in the cavity (240, 340), wherein the first braking component (250, 350) comprises a body (260, 360) and a first braking surface (270, 370);

a second braking component (280, 380) comprising a second braking surface (290, 390);

wherein the first braking component (250, 350) is arranged on one side of the guide rail (20, 330) received in the elongate channel and the second braking component is arranged on the other side of the guide rail (20, 330) received in the elongate channel;

wherein the first braking component (250, 350) is arranged to move in a direction generally parallel to the channel axis between a first position and a second position (B); and wherein, when the first braking component (250, 350) is in the first position, the first braking surface (270, 370) and the second braking surface (290, 390) define a first separation distance ($D_1$) that is greater than a width of the guide rail (20, 330) and when the first braking component (250, 350) is in the second position (B), the first braking surface (270, 370) and the second braking surface (290, 390) define a second separation distance ($D_2$), wherein the second separation distance ($D_2$) is less than the first separation distance ($D_1$); and wherein, when the first braking component (250, 350) is in the second position, the first braking surface (270, 370) engages the elevator guide rail (20, 330) such that a braking force is applied thereto.

15. A method (700) of manufacturing a safety block (210, 310), the method (700) comprising:

preparing a polymeric material or a polymer-based composite material for moulding (710); and introducing the polymeric material or the polymer-based material into a mould (730);

wherein the mould is arranged to produce a safety block (210, 310) comprising:

an elongate channel (220) defining a channel axis (225, 325), wherein the elongate channel (220) is for receiving an elevator guide rail (20, 330) of the elevator system (10) when in use; and a cavity (240, 340) for housing a first braking component (250, 350);

wherein the cavity is suitable for the first braking component (250, 350) to have a first position (A) and a second position (B), and for the first braking component to move therebetween in a direction generally parallel to the channel axis; and removing the safety block (210, 310) from the mould.

16. The method of claim 15, wherein the method further comprises:

inserting (720) an internally threaded component into the mould before introducing the polymeric material or the polymer-based material into the mould such that the internally threaded component is overmoulded.

* * * * *